US006494493B1

United States Patent
Baruh

(12) United States Patent
(10) Patent No.: US 6,494,493 B1
(45) Date of Patent: Dec. 17, 2002

(54) DEVICE AND METHOD FOR COUPLING PIPES

(76) Inventor: Bradford G. Baruh, 816 Hayne Rd., Hillsborough, CA (US) 94010

( * ) Notice: Subject to any disclaimer, the term of this patent is extended or adjusted under 35 U.S.C. 154(b) by 0 days.

(21) Appl. No.: 09/932,784

(22) Filed: Aug. 17, 2001

(51) Int. Cl.$^7$ .......................... F16L 21/00; F16L 25/00
(52) U.S. Cl. .............................. 285/31; 138/97; 285/15
(58) Field of Search .................... 285/5, 15, 31, 285/39, 93, 122.1, 132.1, 133.11, 133.3; 138/110, 99, 97

(56) References Cited

U.S. PATENT DOCUMENTS

| | | | |
|---|---|---|---|
| 176,796 A | 5/1876 | Martin | |
| 349,146 A | 9/1886 | Duff | |
| 1,325,147 A | 12/1919 | Donnelly | |
| 1,770,852 A | 7/1930 | Hill | |
| 1,781,091 A | 11/1930 | Wilson | |
| 2,107,716 A | 2/1938 | Singleton | |
| 2,403,839 A | 7/1946 | Adolph | |
| 2,486,141 A | 10/1949 | Follo | |
| 2,576,630 A | 11/1951 | Mueller et al. | |
| 2,680,631 A | 6/1954 | Smith | |
| 2,690,193 A | 9/1954 | Smith | |
| 2,702,715 A | 2/1955 | Andrews | |
| 2,834,615 A | 5/1958 | Bleakley | |
| 2,866,981 A | 1/1959 | McMinn | |
| 3,491,461 A | 1/1970 | Echterling | |
| 3,495,629 A | 2/1970 | Botsolas et al. | |
| 3,635,504 A | 1/1972 | Borden et al. | |
| 3,826,521 A | * 7/1974 | Wilhelmsen | ................. 285/31 |
| 4,037,861 A | 7/1977 | Medney | |
| 4,109,944 A | 8/1978 | Curtin | |
| 4,218,812 A | 8/1980 | Jönsson | |
| 4,386,796 A | * 6/1983 | Lyall et al. | ................. 285/302 |
| 4,416,306 A | * 11/1983 | Le Devehat | ................. 137/615 |
| 4,543,912 A | * 10/1985 | Steudler, Jr, | ................. 119/475 |
| 4,687,232 A | * 8/1987 | Zimmerman | ................. 285/302 |
| 4,810,008 A | * 3/1989 | Brodie | ................. 285/31 |
| 5,393,103 A | * 2/1995 | Cretzler | ................. 285/31 |
| 5,778,935 A | * 7/1998 | Koch | ................. 138/97 |
| 5,803,506 A | 9/1998 | Argersinger et al. | |
| 5,931,200 A | * 8/1999 | Mulvey et al. | ................. 138/110 |
| 5,975,587 A | * 11/1999 | Wood et al. | ................. 156/158 |
| 6,209,926 B1 | 4/2001 | Mastro | |
| 6,224,116 B1 | 5/2001 | Caraveo et al. | |
| 6,318,761 B1 | * 11/2001 | Robertson | ................. 285/31 |

FOREIGN PATENT DOCUMENTS

GB 2135415 A * 8/1984
JP 54-125526 * 9/1979

* cited by examiner

Primary Examiner—Lynne H. Browne
Assistant Examiner—Aaron M. Dunwoody
(74) Attorney, Agent, or Firm—Burns, Doane, Swecker & Mathis LLP

(57) ABSTRACT

The device and method for coupling pipes includes an elongated housing having a first end and a second end, such that the housing define an elongated cylindrical bore therein. A stop is located on an inner diameter of the housing between the first end and the second end of the housing, and a distance from the stop to the first end of the housing is greater than a distance from the stop to the second end. The device provides a low cost, easy to use and cost-effective way to repair or connect pipe ends.

12 Claims, 6 Drawing Sheets

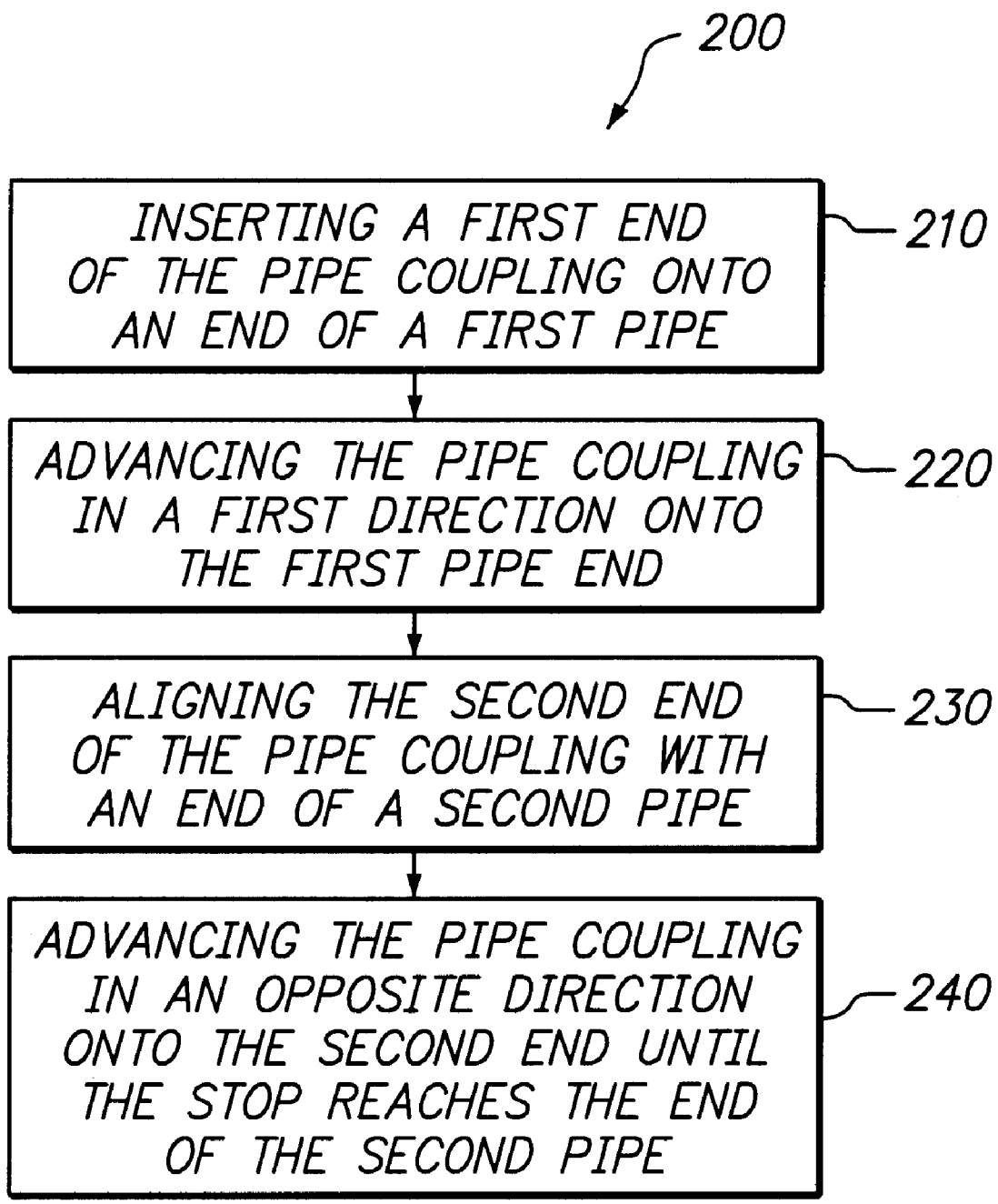

DEVICE AND METHOD FOR COUPLING PIPES

BACKGROUND OF THE INVENTION

Sprinkler systems using plastic or PVC (polyvinyl chloride) pipes have become widely used as a result of their low cost and ease of connection and repair. Such pipes, may be joined without threading by applying an adhesive such as a solvent cement to the ends of the pipes and slipping a pipe coupling over the ends.

However, installing new pipe and repairing sprinkler systems and broken pipes has traditionally been a difficult and complicated procedure. When a break occurs in an underground sprinkler system, the repair process has required isolating the break and then excavating around or otherwise clearing a long section of the PVC pipe surrounding the break. As disclosed in Zimmerman, U.S. Pat. No. 4,687,232, a long section of pipe on both sides of the break is required because the standard repair coupling until now has comprised a short piece of similar PVC piping which is radially enlarged relative to the pipe to be repaired and which is slipped and solvent welded over the broken ends of pipe. This requires that the broken ends of pipe be relatively free in order to have enough play to be bent back so that the weld coupling may be inserted and then the broken ends of pipe moved toward each other into the coupling. This method of bending and moving the pipe sections to be joined frequently results in an insertion of extra pipe length into the existing pipe line exerting additional stresses upon the pipe line. This problem is exacerbated in the instance of PVC pipe having a large diameter since in order to gain the required flexibility, a much greater length of pipe must be cleared on either side of the break. The same difficulties pertain wherein an additional branch pipe is to be added to an existing line since the existing pipe must be cut and a T-coupling inserted in the manner described above.

In repairing non-PVC pipe, the process is much more complicated. Frequently the entire length of pipe which is broken must be removed and a new length of pipe, if it is compatible, must be replaced and sometimes forced into place to fit the existing couplings. Otherwise, a torch cutting procedure must be employed and then a new length of pipe must be fitted and welded or otherwise heat fused into place.

In addition, the use of pipe couplings is not limited to the repair of sprinkler systems and other broken pipes. Pipe couplings are also in demand for new construction projects.

In repairing old sprinklers or completion of new construction, various devices have been developed and used. One solution has been the use of an extendable housing which is expensive. Alternatively, when repairing or completing a section of pipe, if a gap is left for removing a section of broken pipe or inaccurate measurements in new construction, using traditional pipe couplings, at least two pipe couplings and a length of pipe is needed to repair or complete the section of pipe. The present invention can repair or complete most of these sections with a single pipe coupling.

Accordingly, what is needed is a low cost, easy to use and effective means of coupling pipe ends for use with sprinkler systems, conduits in walls or fixed pipes in substrates, and other coupling of pipe ends.

Zimmerman, U.S. Pat. No. 4,687,232 discloses an in-line pipe coupling including a joint housing which encloses a piston means having a standard diameter pipe section which protrudes from one end of the joint housing that may be compressed and inserted into a small cutaway section of existing pipeline and then expanded to fit over the two free ends of pipe using a coupling on the sliding end to form a continuous water tight connection. The slip joint may be utilized in conjunction with either a standard or straight pipe coupling or a T-coupling or cross coupling in order to facilitate addition of one or more branch lines to an existing pipeline.

Curtain, U.S. Pat. No. 4,109,944 discloses a coupling for unthreaded pipes of a sprinkler system, which permits the replacement of a small damaged pipe section without bending the pipes already emplaced in the ground. The coupling includes a pair of semi-cylindrical pipe sections adapted to fit around and engage the emplaced pipes. The longitudinal edges of the two semi-cylindrical pipe sections are formed so as to mate with one another to hold the sections together as an applied adhesive forms a water tight seal.

It would be highly desirable to provide an easy to use and cost-effective way to repair or connect pipe ends.

SUMMARY OF THE INVENTION

This invention provides a simple, low-cost way of repairing or completing the assembly of pipe ends.

In accordance with one aspect of the present invention, a pipe coupling includes an elongated housing having a first end and a second end, the housing defining an elongated cylindrical bore therein; a stop located on an inner diameter of the housing, the stop located between the first end and the second end of the housing; and wherein a distance from the stop to the first end of the housing is greater than a distance from the stop to the second end.

In accordance with another aspect of the present invention, a pipe coupling includes an elongated housing having a first end and a second end, the housing defining an elongated cylindrical bore therein; a stop located on an inner diameter of the housing, the stop located between the first end and the second end of the housing; wherein a distance from the stop to the first end of the housing is greater than a distance from the stop to the second end, the housing having a length of between about 3½ and about 5½ inches.

In accordance with a further aspect of the present invention, a method for using a pipe coupling includes the steps of inserting a first end of the pipe coupling onto an end of a first pipe, the pipe coupling having an elongated housing having a first end and a second end, the housing defining an elongated cylindrical bore therein, a stop located on an inner diameter of the housing and between the first end and the second end of the housing, and wherein the distance from the stop to the first end of the housing is greater than the distance from the stop to the second end; advancing the pipe coupling in a first direction onto the first pipe; aligning the second end of the pipe coupling with an end of a second pipe; and advancing the pipe coupling in an opposite direction onto the second pipe until the stop reaches the end of the second pipe.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 11 is a flow diagram of a method of use of the pipe coupling according to the present invention;

DETAILED DESCRIPTION OF THE PREFERRED EMBODIMENTS

The device and method according to the present invention provide a low cost and easy-to-use pipe coupling that avoids the difficulties associated with standard pipe couplings.

Figure 1:
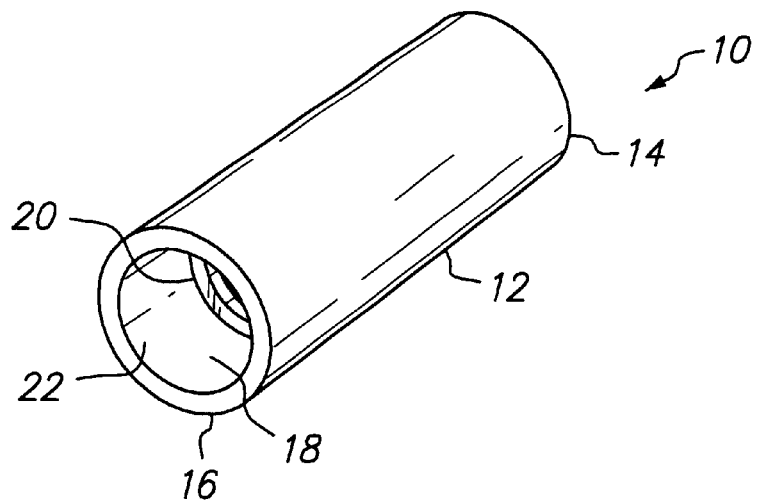
FIG. 1 is a perspective view of a pipe coupling according to the present invention.
Figure 2:
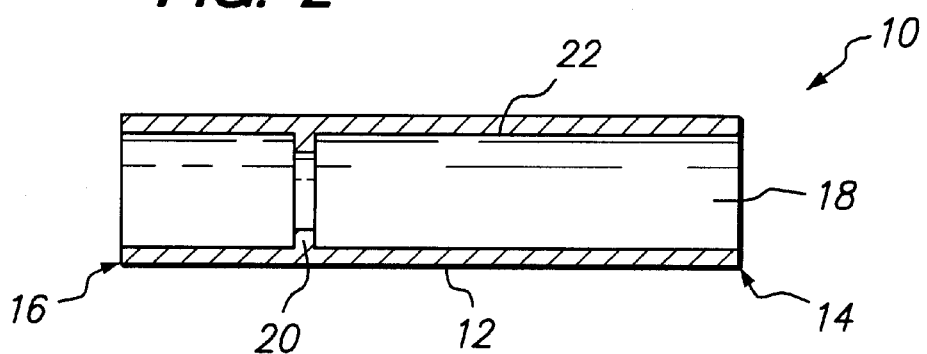
FIG. 2 is a cross-sectional view of FIG. 1.

The invention can be best understood by reference to FIGS. 1 and 2 which illustrate a basic form of the pipe coupling 10. The pipe coupling 10 includes an elongated housing 12 having a first end 14 and a second end 16, the housing 12 defining an elongated cylindrical bore 18 therein. A stop 20 is located on an inner diameter 22 of the housing 12, and between the first end 14 and the second end 16 of the housing 12. A distance from the stop 20 to the first end 14 of the housing 12 is greater than a distance from the stop 20 to the second end 16.

The elongated housing 12 preferably has a circular outer diameter. However, it may be appreciated that the outer diameter of the housing 12 may be square or any other shape.

Figure 15:
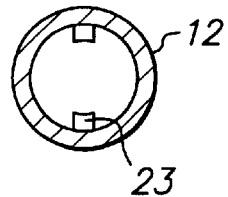
FIG. 15 is an end elevation view of the pipe coupling according to the present invention with rectangular stops.
Figure 16:
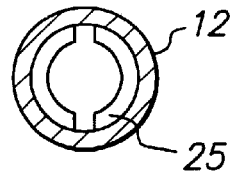
FIG. 16 is an end elevation view of the pipe coupling according to the present invention with half circle stops.

The stop 20 is located on the inner diameter 22 of the elongated housing 12. As shown in FIG. 2, the stop 20 is preferably a circular ring, however, as shown in FIGS. 15 and 16, respectively, the stop 20 may also be at least two rectangular inserts 23, two half circles 25 or any other shape which prevents the pipe coupling 10 from advancing beyond a certain point.

In addition, the stop 20 provides a means for insuring that the pipe ends have sufficient overlap between an outer surface of the pipe ends and the inner diameter 22 of the housing 12 for a proper seal to be formed. The stop 20 also ensures that a sufficient amount of an adhesive will be present to bond the outer diameter of the pipe end to the inner diameter 22 of the pipe coupling 10.

The distance from the stop 20 to the first end 14 is between about two to ten times the distance from the stop 20 to the second end 16. However, it may be appreciated that the distance can vary depending on the particular use of the pipe coupling 10.

Figure 17:
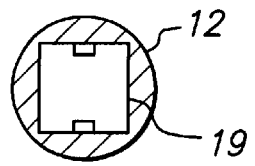
FIG. 17 is an end elevation view of the pipe coupling according to the present invention with a rectangular bore.
Figure 18:
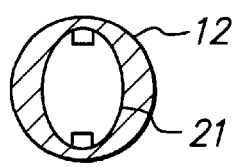
FIG. 18 is an end elevation view of the pipe coupling according to the present invention with an oval bore.

The housing 12 of the pipe coupling 10 has a cylindrical bore 18 therein which provides a conduit or fluid flow channel. The cylindrical bore 18 is preferably cylindrical, however, as shown in FIGS. 17 and 18, respectively, the bore may be rectangular 19 or oval 21. In addition, the first end 14 and the second end 16 of the pipe coupling 10 are beveled on the inner diameter 22 of the cylindrical bore 18. The beveled edges 26, as shown in FIG. 3, provide a smooth and easy transition for the pipe coupling 10 to slide onto the pipe end.

Figure 3:
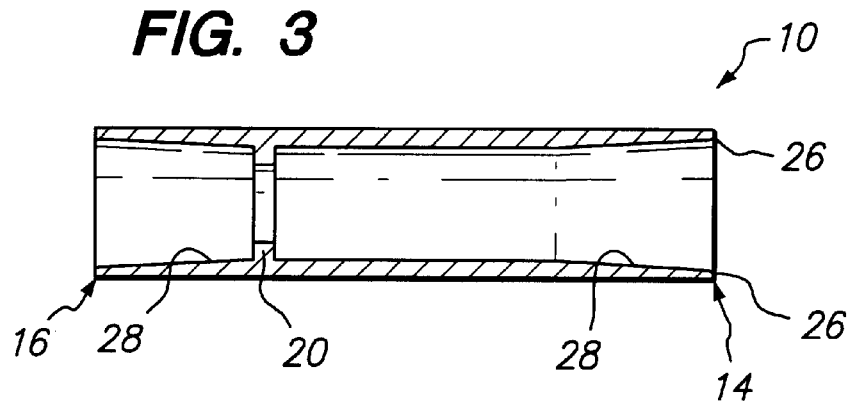
FIG. 3 is a cross-sectional view of an alternative embodiment of the pipe coupling according to the present invention with a tapered end and beveled edge.

In one embodiment of the present invention, also shown in FIG. 3, the cylindrical bore 18 of the housing 12 at the first end 14 is tapered 28 toward the stop 20. The taper preferably does not extend from the first end 14 to the stop 20. The taper provides easy application of the pipe coupling 10 on the pipe ends which may be damaged and no longer have a cylindrical shape. Thus, the taper will be at an angle between about 0° degrees and 0.5° degrees. The tapered end also provides ease in applying an adhesive to the inner diameter 22 of the pipe coupling 10 for bonding of the pipe coupling 10 to the outer diameter of the pipe end. Alternatively, the second end 16 of the pipe coupling 10 may also be tapered toward the stop 20, or both the first end 14 and the second end 16 of the pipe coupling 10 are tapered toward the stop 20.

Figure 4:
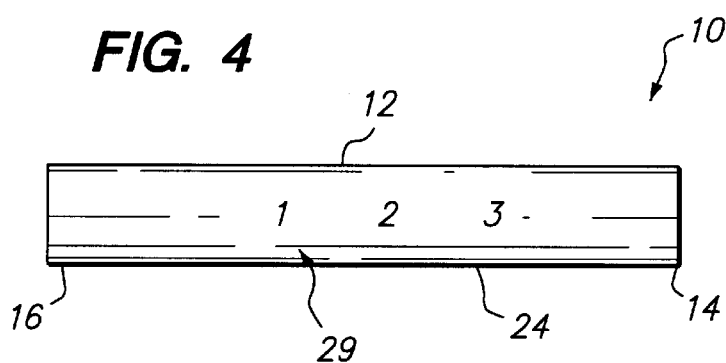
FIG. 4 is a cross-sectional view of an alternative embodiment of the pipe coupling according to the present invention with a series of markings on an outer diameter of the pipe coupling.

In one embodiment as illustrated in FIG. 4, the housing 12 has a series of markings 29 on an outer diameter 24 of the pipe coupling 10 to identify the distance from the second end 16 of the pipe coupling 10 to the first end 14. Preferably as shown in FIG. 4, the marking will also serve as a means for identifying the length of the device or preferred use. This provides a consumer the ability to ascertain the length of the pipe coupling 10 when purchasing the pipe coupling 10. Alternatively, the markings 29 on the outer diameter of the pipe coupling 10 provides a measurement for cutting the pipe coupling 10 to a shorter length if needed. The markings avoid the need to measure the length of the pipe coupling, mark the location where the cut is going to be made and then cut the pipe coupling 10. The markings 29 also indicate the distance between the broken pipes, and the desired cut.

The pipe coupling 10 is preferably molded of PVC (polyvinyl chloride). However, it may be appreciated that the pipe coupling 10 may be made by other known methods of any type of plastic, rubber, steel or any other material suitable for sprinkler systems, electrical conduit, sewer pipes, or any other situation where two pipe ends are coupled.

Figure 5:
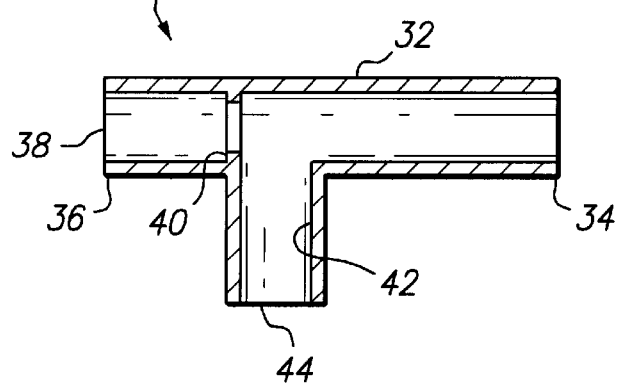
FIG. 5 is a cross-sectional view of an alternative embodiment of a T-shaped pipe coupling according to the present invention.

As illustrated in FIG. 5, in an alternative embodiment, the housing 32 of the pipe coupling 30 forms a "T" joint for the connection of three pipes. Here, a third end 44 is at a 90-degree angle or perpendicular to the first end 34 and the second end 36 forming a second cylindrical bore 42. A stop 40 is located in the first cylindrical bore 38. It may be appreciated that the third end 44 will accommodate all standard fittings including nipples, inserts, additional piping, 45 degree angle inserts, 90 degree angle inserts, or adapters for special fittings.

Figure 6:
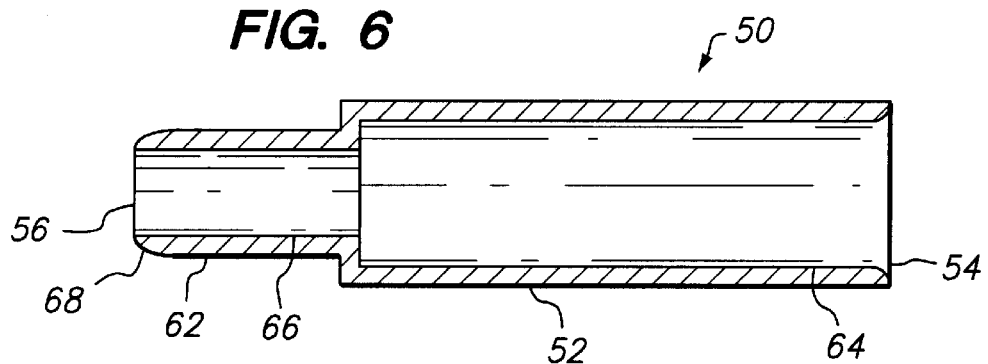
FIG. 6 is a cross-sectional view of another embodiment of the pipe coupling according to the present invention for connecting pipes of different sizes.

FIG. 6 illustrates a further embodiment of the present invention wherein the outer diameter 62 of the second end 56 of the pipe coupling 50 is equal to or slightly smaller than the inner diameter of a pipe end. In addition, the first end 54 of the pipe coupling 50 has an inner diameter 64 greater than an inner diameter 66 of the second end 56. The outer diameter 62 of the second end 56 of the pipe coupling 50 is beveled on the edge 68 for ease of insertion into the pipe end. This pipe coupling 50 forms what is commonly known as a male/female coupling. It may be appreciated that the outer diameter 62 of the second end 56 of the pipe coupling 50 may fit inside the inner diameter of the pipe end or inside the inner diameter of a broken pipe end. Thus, the outer diameter 62 of the second end 56 of the pipe coupling 50 may vary in diameter.

Figure 7:
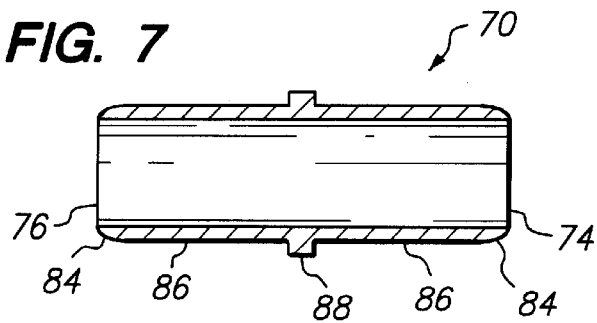
FIG. 7 is a cross-sectional view of an alternative embodiment of an internal pipe coupling according to the present invention.

FIG. 7 illustrates another embodiment of the present invention of FIG. 6 configured to be inserted inside of the ends of the pipes to be connected wherein the outer diameter 86 of the first end 74 of the pipe coupling 70 is equal to or slightly smaller than an inner diameter of a second pipe end, and the pipe coupling 70 has an outer diameter 86 with a stop 88 located on the outer diameter 86 of the pipe coupling 70. The outer diameter 86 of the first end 74 and the second end 76 are beveled 84.

Figure 8:
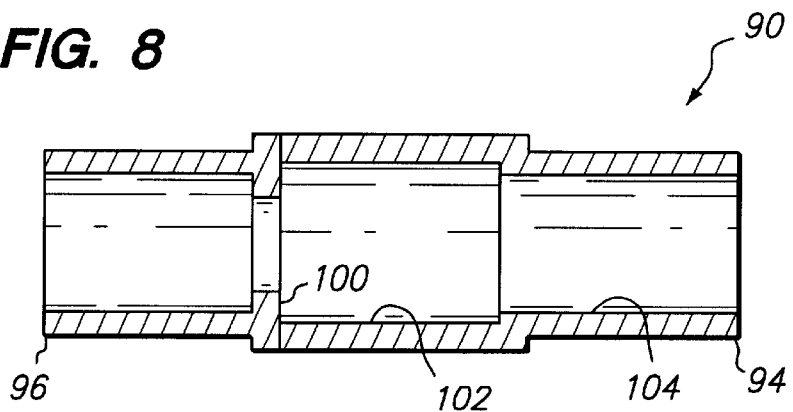
FIG. 8 is a cross-sectional view of another embodiment of the pipe coupling according to the present invention.

In another embodiment as illustrated in FIG. 8, the first end 94 of the pipe coupling 90 has a first inner diameter 102 and a second inner diameter 104 wherein the first inner diameter 102 is greater than the second inner diameter 104. A stop 100 is located between the first end 94 and the second end 96 to ensure that a sufficient amount of an adhesive will be present to bond the pipe coupling 90 to the pipe end. The first inner diameter 102 provides reduced friction as the pipe coupling 90 is advanced onto the pipe end since the first inner diameter is not in contact with the pipe end. In addition, the pipe coupling 90 requires less adhesive to attach the pipe coupling 90 to the pipe end.

In a preferred embodiment, the pipe coupling 10 has a length of between about 3½ inches and about 5½ inches. However, it can be appreciated that the length of the pipe coupling may vary in length. In addition, the pipe coupling will preferable have an outer diameter of about ½ inch to about 1 inch. Once again, however, it can be appreciated that the outer diameter and inner diameter of the pipe coupling can be manufactured in most any diameter from about ¼ inch to about 8 inches.

Figure 9:
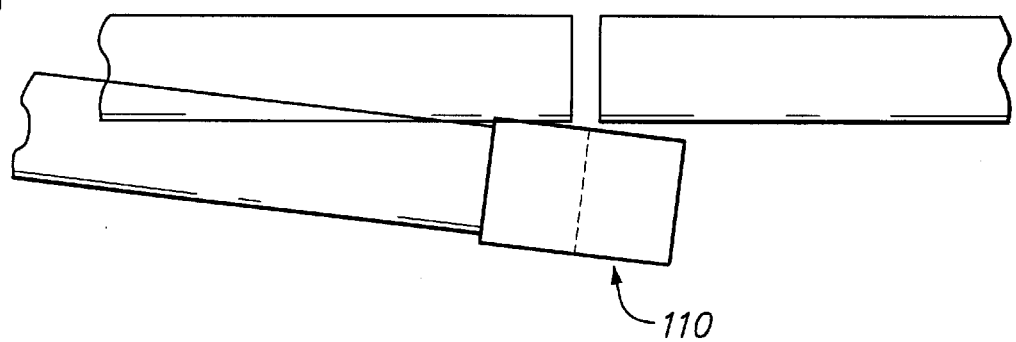
FIG. 9 is an illustration of the use of a standard pipe coupling.

As shown in FIG. 9, traditionally, when a break occurs in a PVC sprinkler system, it can be repaired by digging away the dirt over the break, cutting a small section of pipe containing the break, and connecting a new section of pipe in place using a pipe coupling 110. Generally, the coupling can be installed by bending one or both of the pipes in the ground, so that the gap between the pipes is sufficient to insert the pipe coupling onto the ends of the two pipe ends. Once the coupling is inserted onto the pipe ends the pipes are released and returned to their original positions. However, this type of repair can be very difficult and presents several problems including having to remove the dirt around the pipes to permit sufficient bending of the pipes and if too much of the pipe is cut away the pipe coupling may not be able to connect the two pipe ends regarding addition of a replacement pipe segment and two couplings. In addition, in some circumstances, there may not be sufficient room to make such a repair.

Figure 10A:
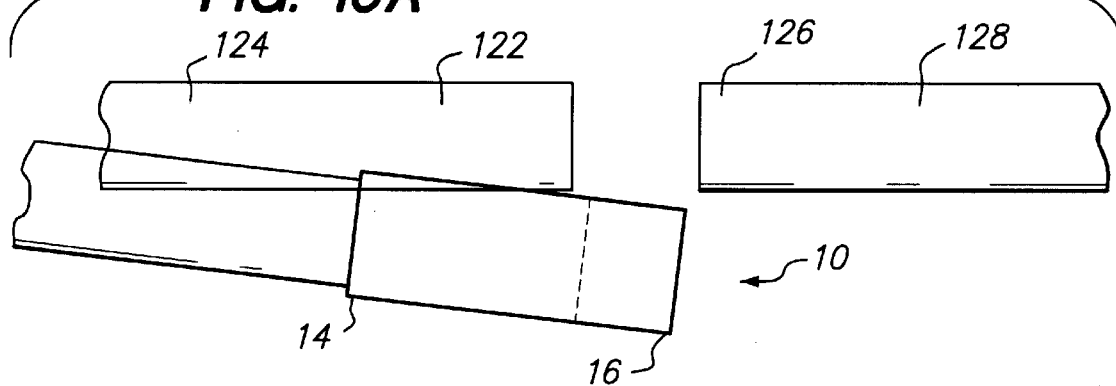
FIGS. 10A and 10B are an illustration of the use of a pipe coupling according to the present invention.
Figure 10B:
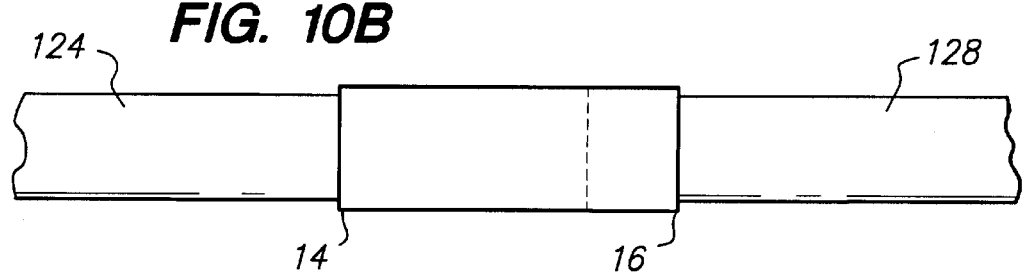

In operation, the pipe coupling 10 of the present invention is used for repairing a sprinkler system as illustrated in FIGS. 10A and 10B. First, the dirt around the break is removed and a small section of the pipe containing the break is removed, as shown in FIG. 10A. However, with the pipe coupling 10 of the present invention, a larger section of the pipe containing the break may be removed without creating any difficulties. Once the section of pipe is removed, the longer end 14 of the pipe coupling 10 of the present invention is placed on one of the pipe ends 122. In marketing the pipe coupling 10 of the present invention, one end will preferably be marked with a different color or marking to allow the user to ascertain which end should be used first. The first end 14 of the pipe coupling 10 is inserted onto a pipe end 122 of a first pipe 124. The pipe coupling 10 is advanced onto the pipe end 122 until the second end 16 of the pipe coupling 10 clears the pipe end 126 of the second pipe 128. In some situations, with the advancing or sliding of the pipe coupling 10 onto the pipe end the user will hear a "click" as the pipe end reaches the stop 20. The second end 16 of the pipe coupling 10 is then aligned with the pipe end 126 of the second pipe 128. The pipe coupling 10 is then advanced in an opposite direction onto the second pipe 128 until the stop 20 reaches the pipe end 126 of the second pipe 128, as shown in FIG. 12B. Once again, a "click" may be heard indicating that the pipe coupling 10 has reached the end of the second pipe. The stop 20 insures that sufficient coverage or overlapping of the pipe coupling 10 and the pipe ends are achieved. In most situations, an adhesive will be applied to the inner diameter 22 of the first end 14 and second end 16 of the pipe coupling 10 before the pipe coupling 10 is inserted onto the pipe ends. The adhesive provides a water or air tight seal between the pipe coupling 10 and the pipe ends.

As shown in FIGS. 10A and 10B, the sprinkler repair can be performed using a single coupling according to the present invention. However, if a traditional coupling was used, a length of pipe would have to be inserted between the two pipe couplings to complete the repair. Thus, the present invention reduces the number of pipe couplings needed for most repair jobs.

FIG. 11 shows a flow diagram of a method of using a pipe coupling according to the present invention 200. The method includes inserting a first end of the pipe coupling onto an end of a first pipe, the pipe coupling having an elongated housing having a first end and a second end, the housing defining an elongated cylindrical bore therein, a stop located on an inner diameter of the housing and between the first end and the second end of the housing, and wherein the distance from the stop to the first end of the housing is greater than the distance from the stop to the second end 210. The pipe coupling advances in a first direction onto the first pipe until the stop reaches the end of the first pipe 220. The second end of the pipe coupling is then aligned with an end of a second pipe 230. The pipe coupling then advances in an opposite direction onto the second pipe until the stop reaches the end of the second pipe 240.

FIGS. 12–14 illustrate use of the pipe coupling 10 in various situations which may be encountered.

Figure 12A:
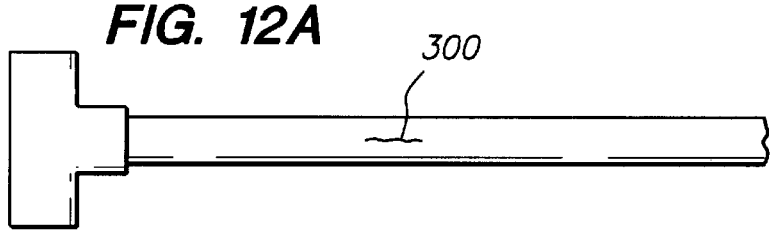
FIGS. 12A–12C are an illustration of another use of a pipe coupling according to the present invention.
Figure 12B:
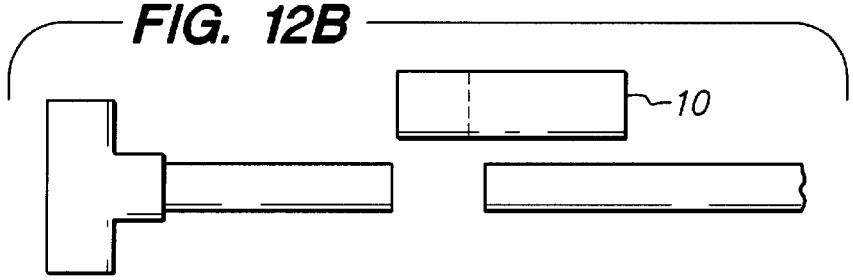
Figure 12C:
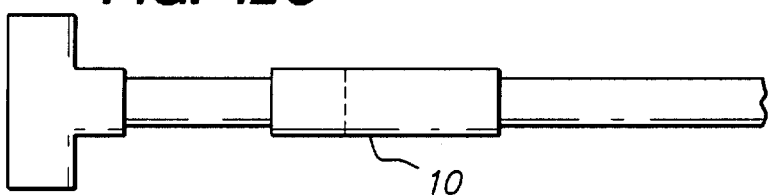

FIGS. 12A–C is a traditional break in a PVC sprinkler system. FIG. 12A shows the break 300 in the PVC pipe. The dirt around the break is removed and a small section of the pipe containing the break is removed as shown in FIG. 12B. Once the section of pipe is removed, a pipe coupling 10 of the present invention is inserted onto one end of the pipe. The pipe coupling is advanced as described above until the second end of the pipe coupling advances onto the pipe end as shown in FIG. 12C.

Figure 13A:
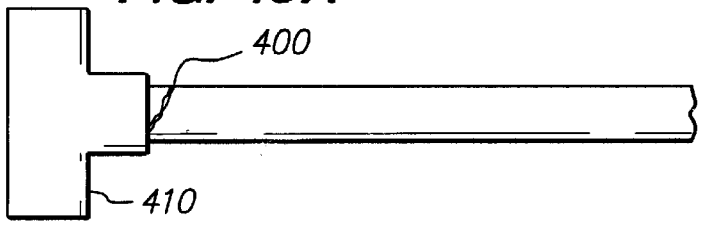
FIG. 13A–13C are an illustration of a further use of a pipe coupling according to the present invention.
Figure 13B:
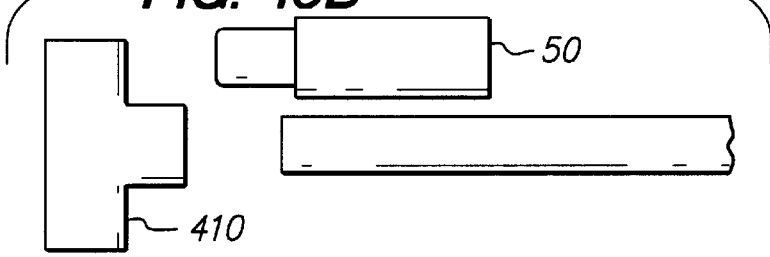
Figure 13C:
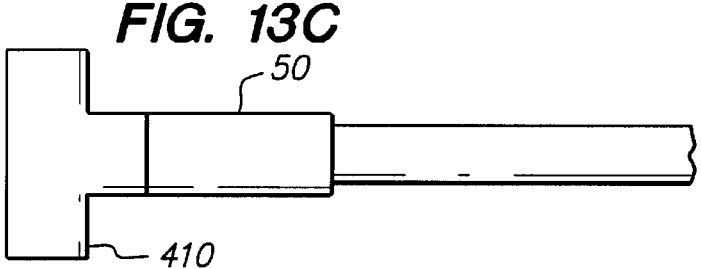

FIGS. 13A–C illustrates the use of another embodiment of the pipe coupling using the female/male coupling, shown in FIG. 6, with a break 400 in the pipe very close to a connector 410. The dirt around the pipe is removed and a small section of the pipe is removed. A pipe coupling 50 as shown in FIG. 13B, wherein the outer diameter of the second end of the pipe coupling is equal to or slightly smaller than an inner diameter of a first pipe end, is used to connect the pipe ends. The pipe coupling 50 is installed as mentioned above and as shown in FIG. 13C with the exception that the second end 56 of the pipe coupling 50 is inserted into the adapter 410.

Figure 14A:
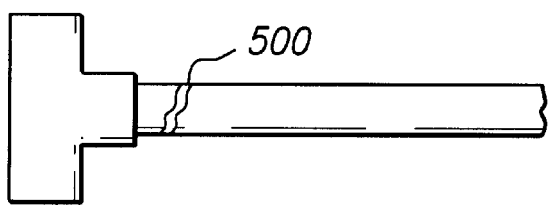
FIGS. 14A–14D are an illustration of another use of a pipe coupling according to the present invention.
Figure 14B:
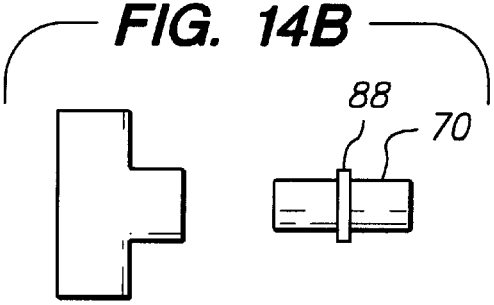
Figure 14C:
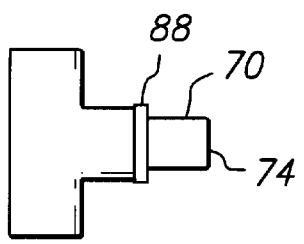
Figure 14D:
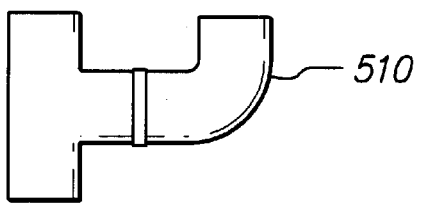

FIGS. 14A–D illustrate the use of a further embodiment of the pipe coupling, as shown in FIG. 7, using a coupling 70 wherein the outer diameter of the first end and second end of the pipe coupling 70 is equal to or slightly smaller than an inner diameter of the pipe ends, and the pipe coupling 70 has an outer diameter with a stop 88 located on the outer diameter of the pipe coupling 70. As shown in FIGS. 14A and 14B, the dirt is removed from around the break 500, and a small section of the pipe is removed. The pipe coupling 70 is then inserted into the inner diameter of the pipe end and positioned within the tube until the stop 88 reaches the edge of the pipe end. Once the pipe coupling 70 is installed as shown in FIG. 14C, an attachment 510 is installed on the second end of the pipe coupling as shown in FIG. 14D.

In normal use, an adhesive will be applied to the inner diameter 22 of the first end 14 and the second end 16 of the pipe coupling 10 before inserting the pipe end into the pipe coupling. Any commercially available adhesive should work with the pipe coupling. The adhesives generally are sold with drying time of between 5 seconds and 5 minutes which provides sufficient time to insert the pipe coupling 10 onto the end of the first pipe end, advance it to the stop 20, align the second pipe end and advance the pipe coupling 10 onto the second pipe end.

The pipe coupling 10 will preferably be manufactured in conventional U.S. measurements or metric lengths depending on the country of use. However, in order to accommodate the various lengths that a consumer may need the pipe coupling 10 can be manufactured to be cut to a desired length using any saw or device including a string saw.

Although, the use of the pipe coupling has been described for use with sprinkler systems including the repair thereof, the use of the pipe coupling described herein is not limited to sprinkler systems. The pipe coupling and method of use can be used with any water system, electrical system or any new installation of any type of pipe wherein two pipe ends are coupled.

In addition, the pipe couplings will preferably be molded plastic, however, it may be appreciated that the pipe couplings can be machined or manufactured by other known methods.

While the invention has been described in detail with reference to the preferred embodiments thereof, it will be apparent to one skilled in the art that various changes and modifications can be made and equivalents employed, without departing from the present invention.

What is claimed is:

1. A pipe coupling comprising:

an elongated housing having a first end and a second end, the housing defining an elongated cylindrical bore therein;

a stop located on an inner diameter of the housing, the stop located between the first end and the second end of the housing, wherein the stop is at least two rectangular inserts; and wherein a distance from the stop to the first end of the housing is greater than a distance from the stop to the second end.

2. The pipe coupling according to claim 1, wherein the distance from the stop to the first end is between about two to ten times the distance from the stop to the second end.

3. The pipe coupling according to claim 1, wherein the housing is made of plastic.

4. The pipe coupling according to claim 1, wherein the inner diameter of the cylindrical bore of the housing at the first end is tapered towards the stop.

5. The pipe coupling according to claim 1, wherein the inner diameter of the cylindrical bore of the housing at the second end is tapered towards the stop.

6. The pipe coupling according to claim 1, wherein the inner diameter of the cylindrical bore of the housing at both the first and second ends is tapered towards the stop.

7. The pipe coupling according to claim 1, wherein at least one end of the housing is beveled.

8. The pipe coupling according to claim 1, wherein the housing has a series of markings on an outer diameter to identify the distance from the second end to the first end.

9. The pipe coupling according to claim 1, wherein the housing has a third end which is at a 90 degree angle to the first end and the second end forming another cylindrical bore.

10. The pipe coupling according to claim 1, wherein the first end has an inner diameter greater than an inner diameter of the second end.

11. The pipe coupling according to claim 10, wherein the outer diameter of the second end of the pipe coupling is equal to or slightly smaller than an inner diameter of a first pipe end.

12. The pipe coupling according to claim 11, where the second end of the pipe coupling has a beveled edge.

\* \* \* \* \*